(12) United States Patent
Stephan et al.

(10) Patent No.: US 7,789,113 B2
(45) Date of Patent: Sep. 7, 2010

(54) INLET FITTING FOR FUEL TANK OF DIESEL MOTOR VEHICLES

(75) Inventors: Markus Stephan, Gnotzheim (DE); André Brandis, Neuenhagen (DE)

(73) Assignee: Alfmeier Prazision AG Baugruppen & Systemlosungen, Treuchtligen (DE)

( * ) Notice: Subject to any disclaimer, the term of this patent is extended or adjusted under 35 U.S.C. 154(b) by 797 days.

(21) Appl. No.: 11/691,544

(22) Filed: Mar. 27, 2007

(65) Prior Publication Data

US 2007/0267099 A1 Nov. 22, 2007

(30) Foreign Application Priority Data

Mar. 27, 2006 (DE) .................. 10 2006 014 438

(51) Int. Cl.
*B65B 1/04* (2006.01)
(52) U.S. Cl. .................................... 141/350; 220/86.2
(58) Field of Classification Search ......... 141/348–350; 220/86.2
See application file for complete search history.

(56) References Cited

U.S. PATENT DOCUMENTS

| | | | | |
|---|---|---|---|---|
| 2,145,758 | A * | 1/1939 | Fellows et al. | 220/822 |
| 6,302,169 | B1 * | 10/2001 | Pulos | 141/301 |
| 6,408,903 | B1 * | 6/2002 | Theuer et al. | 141/348 |
| 6,539,990 | B1 * | 4/2003 | Levey et al. | 141/301 |
| 6,968,874 | B1 * | 11/2005 | Gabbey et al. | 141/349 |
| 7,011,121 | B2 * | 3/2006 | Bar et al. | 141/350 |
| 7,077,178 | B2 * | 7/2006 | Hedevang | 141/367 |
| 7,293,586 | B2 * | 11/2007 | Groom et al. | 141/350 |
| 7,302,977 | B2 * | 12/2007 | King et al. | 141/367 |
| 7,461,673 | B2 * | 12/2008 | Busch et al. | 141/350 |
| 7,621,303 | B2 * | 11/2009 | Buchgraber | 141/350 |

FOREIGN PATENT DOCUMENTS

| | | |
|---|---|---|
| DE | 101 57 090 C1 | 4/2003 |
| DE | 10 2005 047 459 A1 | 8/2006 |
| EP | 1 284 212 A1 | 2/2003 |
| EP | 1 625 964 A2 | 2/2006 |

OTHER PUBLICATIONS

English Abstract of DE 10 2005 047 459 published Aug. 24, 2006.
English Abstract of DE 101 57 090 published Apr. 24, 2003.
English Abstract of EP 1 284 212 published Feb. 19, 2003.

* cited by examiner

*Primary Examiner*—Timothy L Maust
(74) *Attorney, Agent, or Firm*—Dority & Manning, P.A.

(57) ABSTRACT

The device includes a protective mechanism for preventing introduction of a gasoline-type nozzle into an inlet passageway of a fuel tank of a Diesel motor vehicle, the inlet passageway defining a central axis, the protective mechanism comprising two arms mounted at least partially within the inlet passageway, the arms being pivotable around a pivot axis substantially parallel to the central axis. A connector is mounted at least partially within the inlet passageway, the connector being movable in a plane transverse to the central axis, movement of the connector outwardly from an idle position relative to the central axis causing the arms to pivot from an idle position toward a free-flow position. The connector is configured so that insertion of a gasoline-type nozzle into the inlet passageway will not move the arms to the free-flow position, whereas insertion of a Diesel-type nozzle into the inlet passageway will move the arms to the free-flow position.

28 Claims, 8 Drawing Sheets

INLET FITTING FOR FUEL TANK OF DIESEL MOTOR VEHICLES

FIELD OF THE INVENTION

The invention concerns an inlet fitting for fuel tanks of Diesel motor vehicles, which fitting incorporates a filling pipe (i.e. an inlet passageway) suitable for fuel input by an external filling nozzle of the pistol type and which inlet fitting can accommodate the attendant flow of fuel.

BACKGROUND OF THE INVENTION

In EP 1 625 964 A2, EP 1 284 212 A1, DE 100 51 847 A1 and EP 1 586 478 A1 inlet fittings with protective additions are described, which have means to prevent a fuel tank of a Diesel motor from being improperly filled with gasoline. Known inlet fittings of the cited patents encompass a profiled, shape-fit connector (hereinafter, designated as "connector") and a therewith movement-coupled blocking agent. The inlet fittings move between an idle position, during which elements of the fittings extend into the filling pipe, and a released, or free-flow, position during which the penetration of a pistol type feed nozzle therein is permitted. A connector is inserted at a lesser distance within the filling pipe than is the blocking agent, however, the connector invades to such an extent, that the Diesel nozzle can move the inlet fittings radially outward into a free-flow setting whereby the filling pipe then receives intake therefrom, but conversely, the entrance of a nozzle designed for gasoline is rejected, due to the fact that the gasoline nozzle would be of a smaller diameter.

BRIEF SUMMARY OF THE DISCLOSURE

The purpose of the present invention is to propose a tank inlet fitting for Diesel motor vehicles wherein the protection apparatus thereof is alternatively designed.

This purpose is achieved by a blocking agent encompassing two pivotal arms. The arms are pivotally secured on an axle which is parallel to the center axis of the filling pipe, so that in an idle position, the pivotal arms project into the filling pipe. Further, the connector is movably affixed in a plane which is transverse to the central axis of the filling pipe, and the connector is movably coupled with the pivotal arms in such a manner that upon being impacted by a Diesel fuel nozzle, it rotates into a free-flow position. Giving consideration to the required installation space of a protective apparatus, it is of advantage if the movement paths of the blocking agent and of the connectors run parallel to one another and extend along planes which are transverse to the longitudinal center axis of the filling pipe. The diametrical difference between a Diesel nozzle and a gasoline nozzle is only about 2 mm. Upon contact with a Diesel fuel nozzle, the connector is slightly moved radially outward. This small movement must now suffice to enable a blocking agent to prevent an erroneous entry of fuel from a gasoline nozzle into the filling pipe of a Diesel fuel tank, but to allow a Diesel nozzle to penetrate further into the filling pipe and so bring about the free-flow situation. In accord with the invention, this is an assured action, which is effected by the positioning of the blocking agents which possess two arms on one common pivotal axle.

If the blocking agents are forced somewhat nearer to their pivotal axle, then a slight motion in the radial direction will produce a large pivoting arc of the pivotal arms within the filling pipe.

Provision has been made, in the interests of reduced installation space, that the connector be placed between the pivotal arms, and further that the connector act with an end of the arms remote from the central axis of the filling pipe, wherein the end is placed as close as possible to the common pivotal axis of the arms. In such an arrangement, it is of advantage if on the connector two respective projections are present, which respectively are assigned to activation units of the arms. The distance between the projections serves, in this case, as a receiving space for bearing lugs serving the pivotal arms, the openings of which encircle the pivotal axle of the arms. With this arrangement, if the connector be forcibly impacted by a Diesel pistol nozzle, then the connector can move slightly radially outward. Obviously, consideration can be given to the fact that at the activation units of the pivotal arms, projections are present. Since the activation units run somewhat tangentially to the filling pipe, the result is that an intervening space is created which can serve for the placement of the connectors. In a case of an additional, advantageous embodiment, the pivotal arms are bound to a spring element, which tends to retain them in their idle position. In this case, the activation units attach to detent elements which extend along the filling pipe and, when in the idling phase, make contact against the side edges of the connectors. The connector element, in this mode, serves as a detent abutment for the pivotal arms when in the idle phase.

For the transformation of the axial movement of a Diesel-pistol nozzle into a somewhat radial movement, a connector requires a ramp, which acts with the forward end of the pistol nozzle. When the pistol nozzle impacts against this ramp, the connector is no longer subjected to forces which are radial, but rather forces that act in a circumferential but axial direction. The danger is then present that the connector will be overturned and can no longer be impelled by an increased application of force to move radially outward. In an especially advantageous formation, assistance is brought to bear in this instance, in that the part of the connector which extends into the filling pipe becomes encapsulated by a wall element which is of an inclined character and which is so placed in a movable manner that upon a Diesel nozzle impact against its inclined surface, the connector is activated. In this way, a direct mechanical impact against the connector by the Diesel pistol nozzle is prevented. The force components leading to the tipping over of the connector are thus, at least partially, absorbed by the wall element. Advantageously, the wall element is an inwardly flexing, smooth surfaced area of the interior circumference of the filling pipe. The filling pipe wall is, in the case of the inlet filling area, generally made of plastic. On this account, when contacted by a Diesel pistol type nozzle, the smooth surface portion of the inlet tube element possesses accordingly the inherent properties of smooth surfaces and also a certain degree of outward flexibility.

Because the wall element is a part of the filling pipe wall, or at least is bound thereto, force components are introduced into the filling pipe and act in an axial direction with a Diesel pistol nozzle in such a manner that they cannot affect the connector, or can at least affect the connector only to an insignificant degree.

In the case of an additional advantageous embodiment, as a final measure, provision is provided so that the wall element possesses a guide piece for the connector, which is at least effective in the movement direction of the connector. The guide piece is advantageously formed from a wall section, which is molded on in the inside circumferential area of the wall and which extends in the direction of the connector. An upset of the connector then becomes practically impossible. The mentioned smooth surfacing for the wall element is so dimensioned that two windows penetrate the side of the filling pipe. The result of this is that these windows are penetrated by a therethrough projecting pivotal arm. The functional security of the above described protective apparatus is increased in double measure, that is to say, two, instead of one, protective apparatuses are installed, these being diametrically opposite to one another. The possibility is not excluded that more than two protective apparatuses could be installed in circumferential apportionment around the filling tank inlet fitting.

BRIEF DESCRIPTION OF THE DRAWINGS

The invention is explained and described below in greater detail with the aid of accompanying drawings. There is shown in.

DETAILED DESCRIPTION OF THE DRAWINGS

Detailed reference will now be made to the drawings in which examples embodying the present invention are shown. The detailed description uses numerical and letter designations to refer to features in the drawings. Like or similar descriptions in the drawings and description have been used to refer to like or similar parts of the invention.

The drawings and detailed description provide a full and detailed written description of the invention, and of the manner and process of making and using it, so as to enable one skilled in the art to make and use it, as well as the best mode of carrying out the invention. However, the examples set forth in the drawings and detailed description are provided by way of explanation of the invention and are not meant as limitations of the invention. Thus, the present invention includes any modifications and variations of the following examples as come within the scope of the appended claims and their equivalents.

Figure 1:
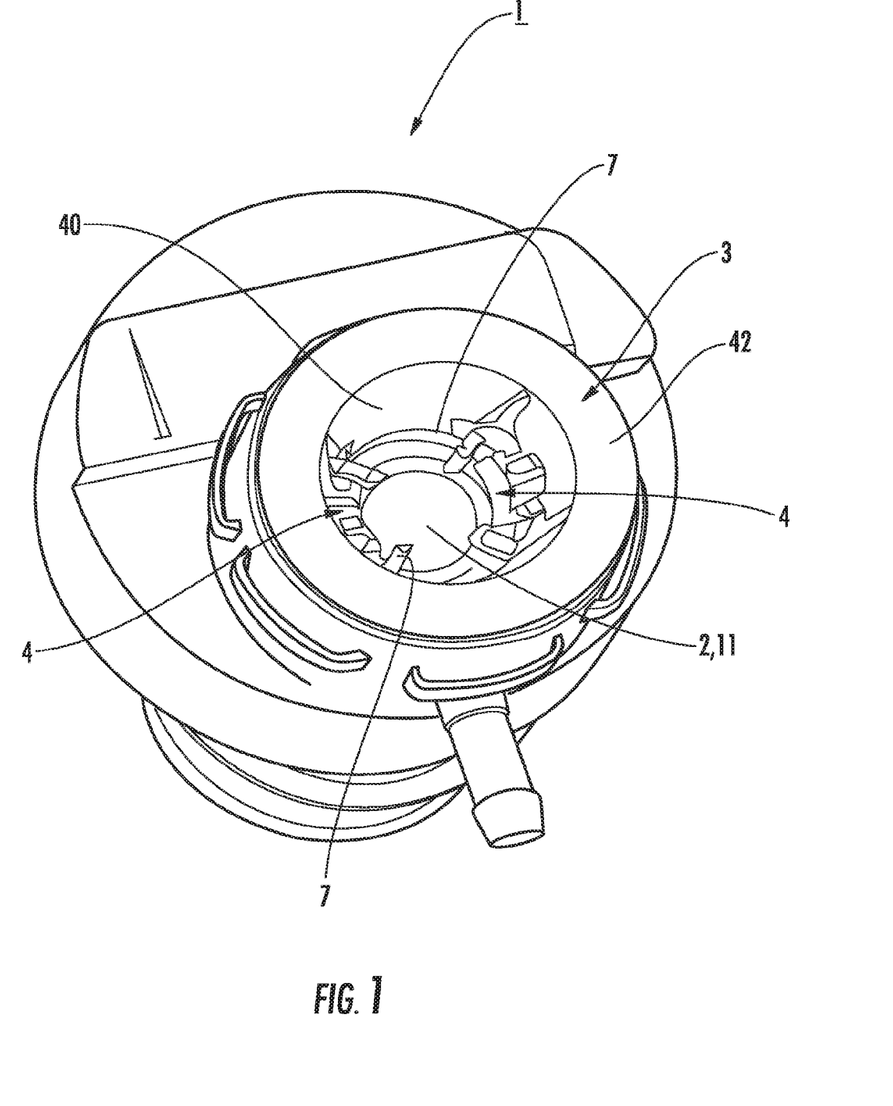
FIG. 1 a filling fitting in a schematic, perspective presentation.

FIG. 1 shows an inlet fitting 1 which is penetrated by a filling pipe (i.e. an inlet passageway) 2. Within the inlet fitting 1 is a housing that may include an integrated insert 3, which possesses two protective apparatuses 4 for the prevention of a faulty tanking attempt with gasoline instead of Diesel fuel.

Figure 2:
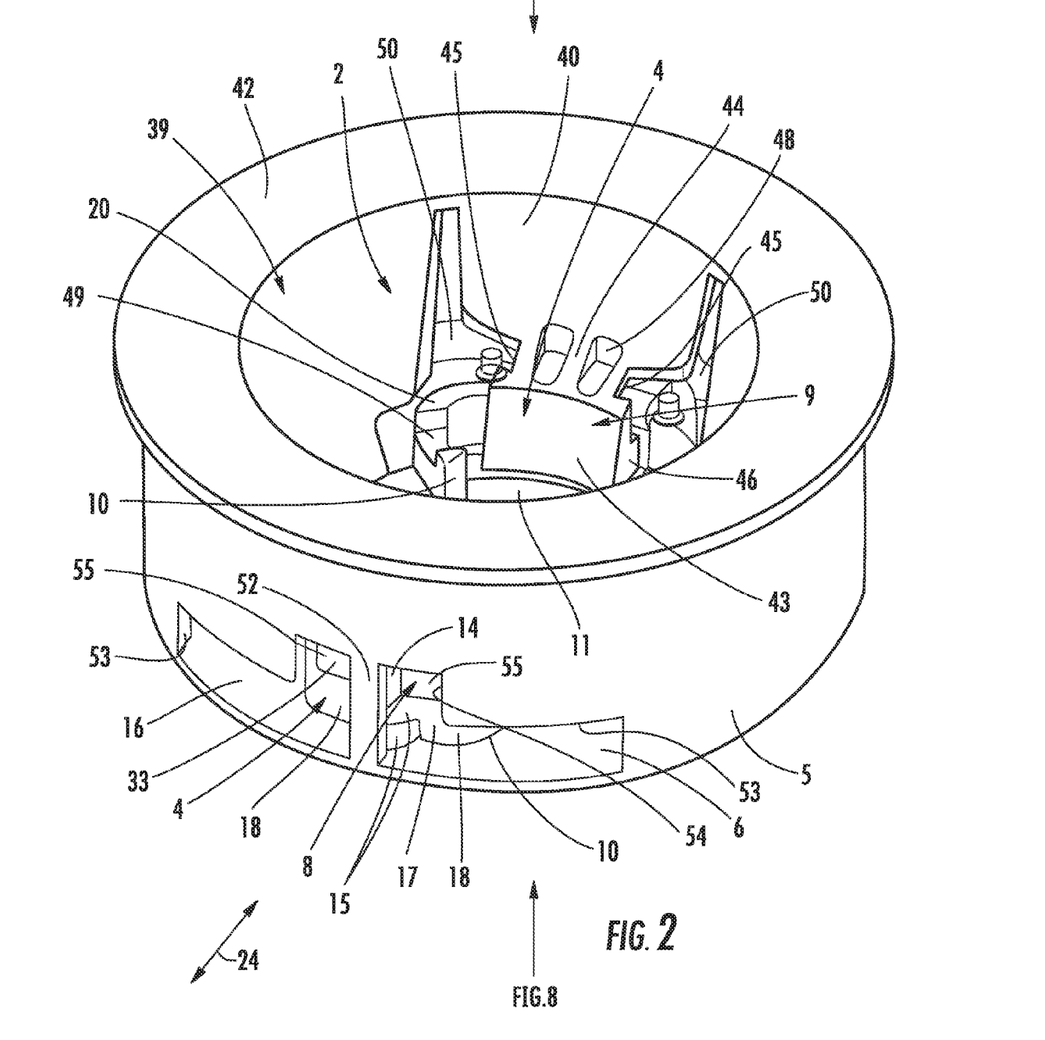
FIG. 2 a part of the filling fitting's integral inserted element comprising two diametrically opposite protective apparatuses in a perspective presentation.
Figure 3:
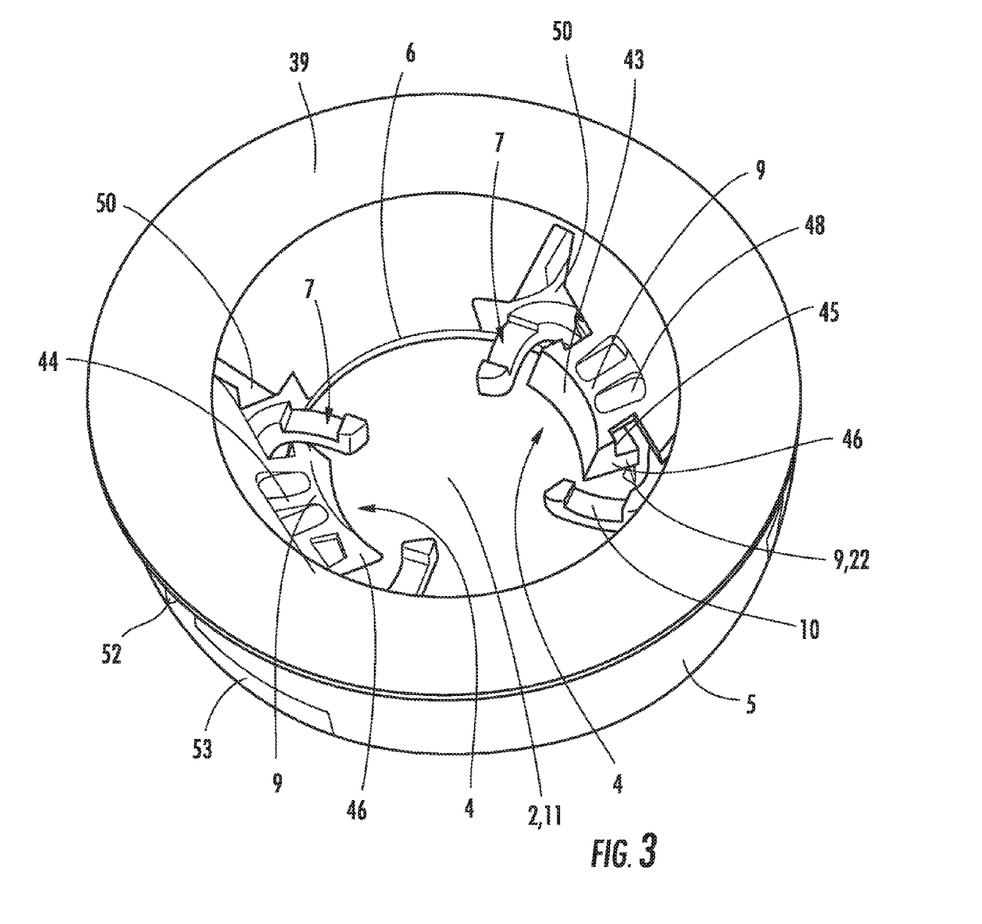
FIG. 3 the inserted member of FIG. 2 from a different viewpoint.
Figure 4:
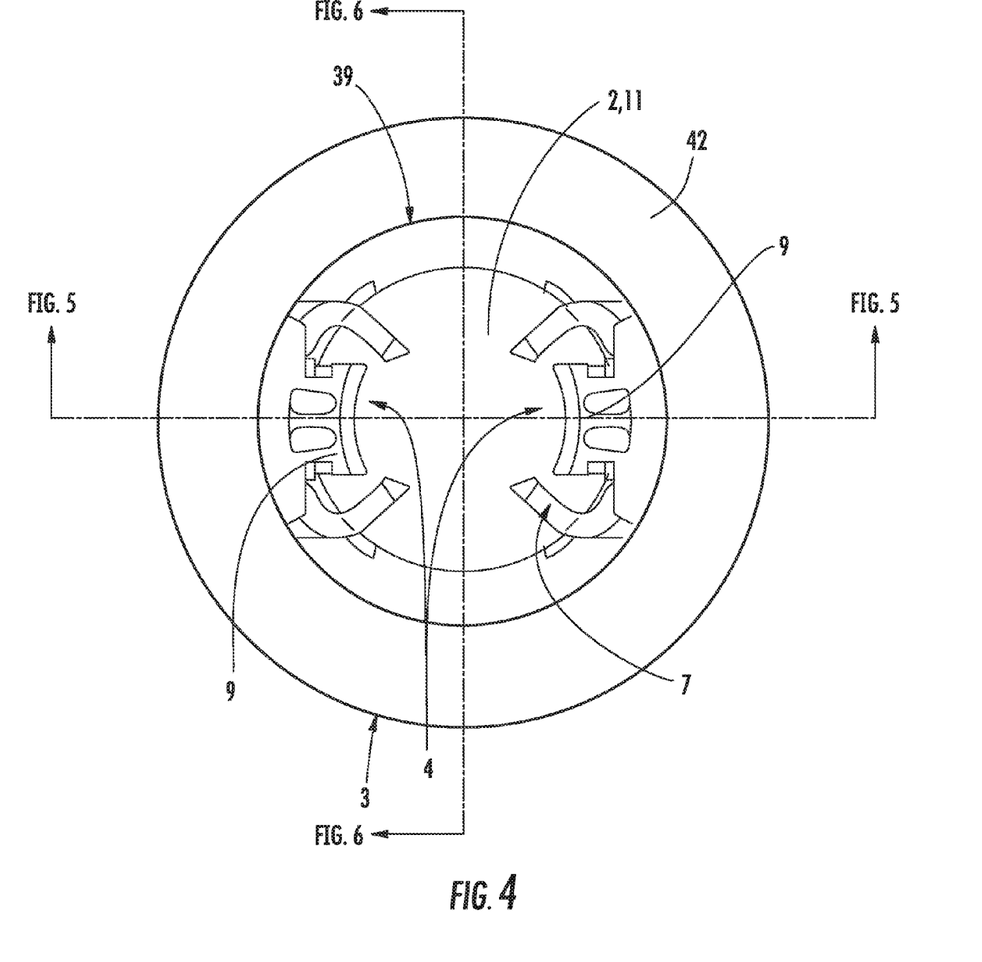
FIG. 4 a top view in the direction of the arrow IV of FIG. 2.

The insert 3 possesses a cylindrical collar 5, on the under end of which, i.e., on that end which is proximal to the fuel tank, a radially inward extending flange 6 is provided by the original plastic molding. At diametrically oppositely disposed positions of the collar 5 of insert 3 are to be found protective apparatuses 4. A protective apparatus includes, respectively, one blocking agent 7, one connector 8 and a wall element 9, which wall element acts with the stated components. A blocking agent 7 encompasses two pivotal arms 10, affixed on a common pivoting axle 14 which projects at a right angle from the top side 16 of the flange 6. Each pivot arm 10 is secured on the axle by two axially disposed bearing lugs 15 which are arranged one above the other, where "above" and "below" are employed in reference to the centerline 13 of the filling pipe 2. The pivot arms 10 run in a plane which is positioned transversely to the centerline 13 of the filling pipe 2. The undersides of the pivot arms 10 are placed level with the plane and run parallel to the upper side 16 of the flange 6. One pivotal arm 10, of which the bearing lug 15 is placed above, possesses a section 17 (see FIG. 2), which connects to this bearing lug 15 and extends in a downward extending part of the pivot axle 14. Furthermore, onto one bearing lug 15, i.e., onto the section 17, is attached respectively an activation unit 18. The activation unit 18, which acts with the connector 8, runs approximately tangentially to the filling pipe 2, that is to say, runs in an approach to an imaginary (in this text) circular cylinder. Onto the activation unit 18 is attached a detent 19, which, in a molded formation, extends perpendicularly toward the filling pipe 2. Again, in a molded on formation, is to be found thereon, hook shaped blocking sections 20, the convex side of each, being placed remotely from the connector 18. In an idle position the blocking sections 20 penetrate the filling pipe 2.

The connector 8 is placed between the pivot arms 10 and encompasses a sliding shoe 22, which is essentially constructed as a flat plate shaped component. The shoe 22 possesses a sliding surface 23 which runs in the same plane as, and parallel to, the top side 16 of the flange 6, with which the surface 23 forms a sliding pair. The shoe 22 exhibits an essentially right angled outline shape, whereby it is so dimensioned, transversely to its direction of movement, i.e., in the direction of its width, that, in an idle position, the detent 19 lies on its side edge 25. In this position, the pivot arms 10 are restrained by a spring element 26 which encompasses them. The spring element 26 is a helical coil in tension, affixed on the top side of pins 27 which project from the pivot arms 10. The pins 27 are placed between the blocking hook assemblies 20 and the detent units 19.

Figure 8:
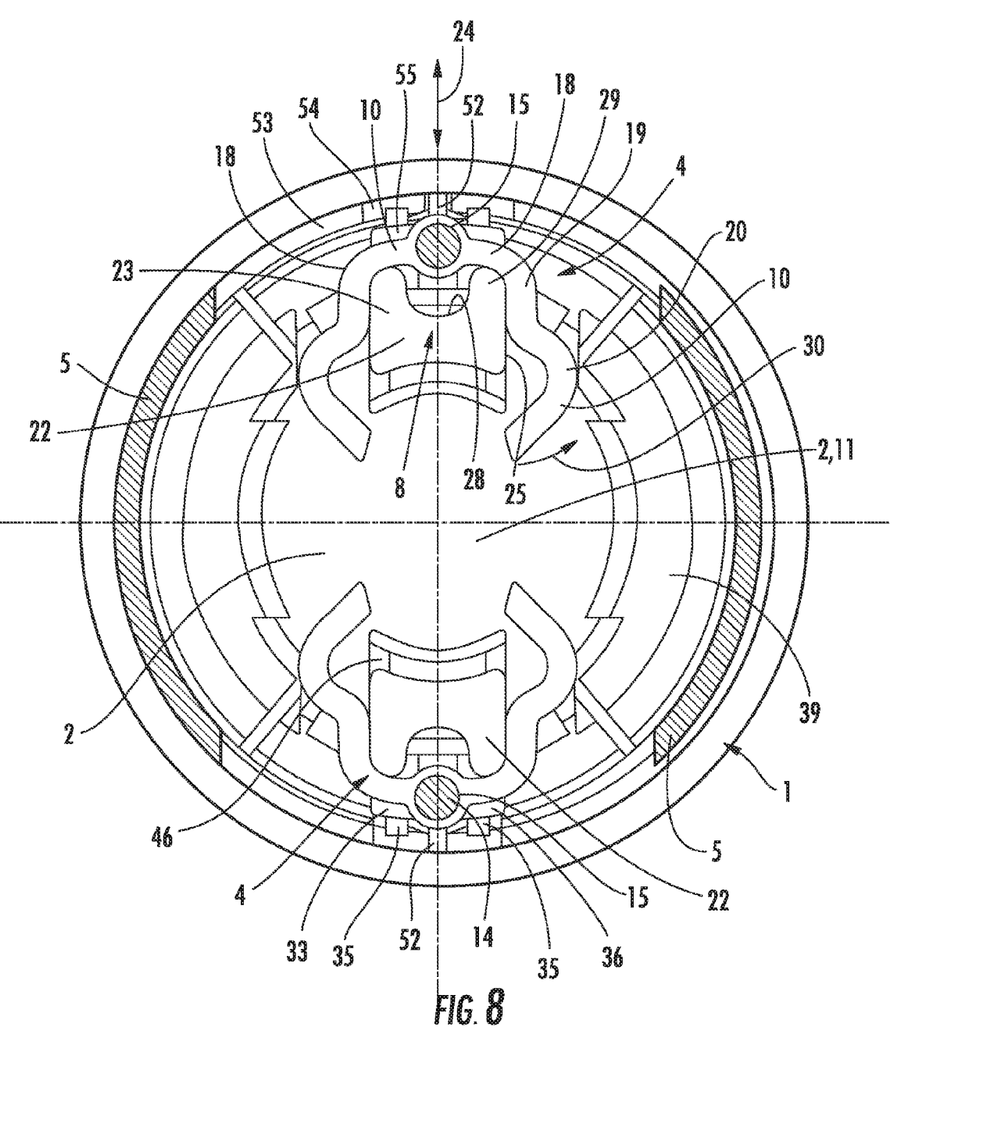
FIG. 8 a view in the direction of the arrow VIII in FIG. 2.

On that end of the sliding shoes 22, which end is proximal to the pivot axle 14, exists a central recess 28, which allows space for two projections 29 extending in the width direction thereof. The projections lie, in an idle position, against the activation units 18 of the pivotal arms 10. If the connector is moved in a direction 24 (see FIG. 2) toward the outside, then the pivotal arms swing in the direction of the arrow 30 (see FIG. 8) out of the filling pipe 2.

Figure 5:
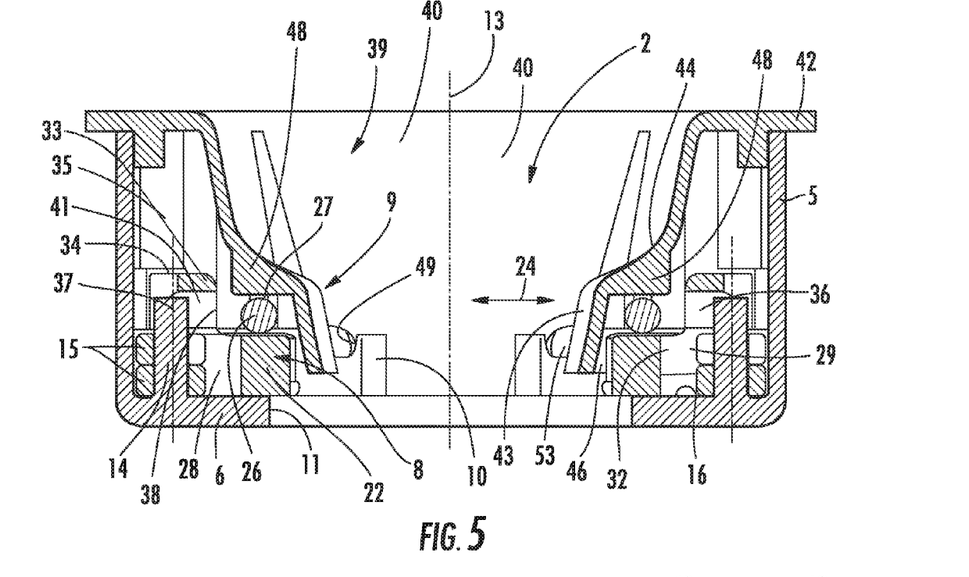
FIG. 5 a cross-section in accord with section line V-V of FIG. 4.
Figure 6:
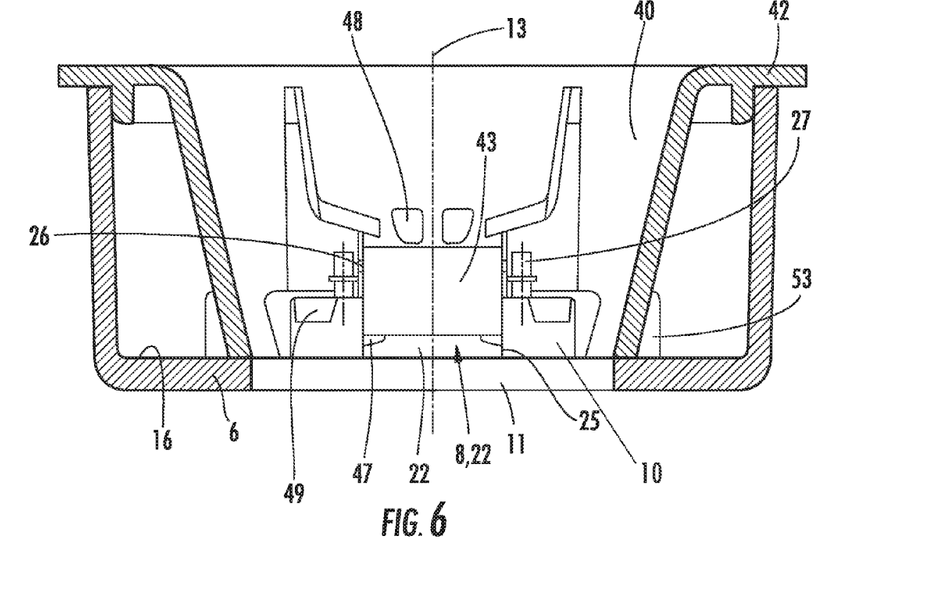
FIG. 6 a cross-section corresponding to section line VI-VI of FIG. 4.
Figure 7:
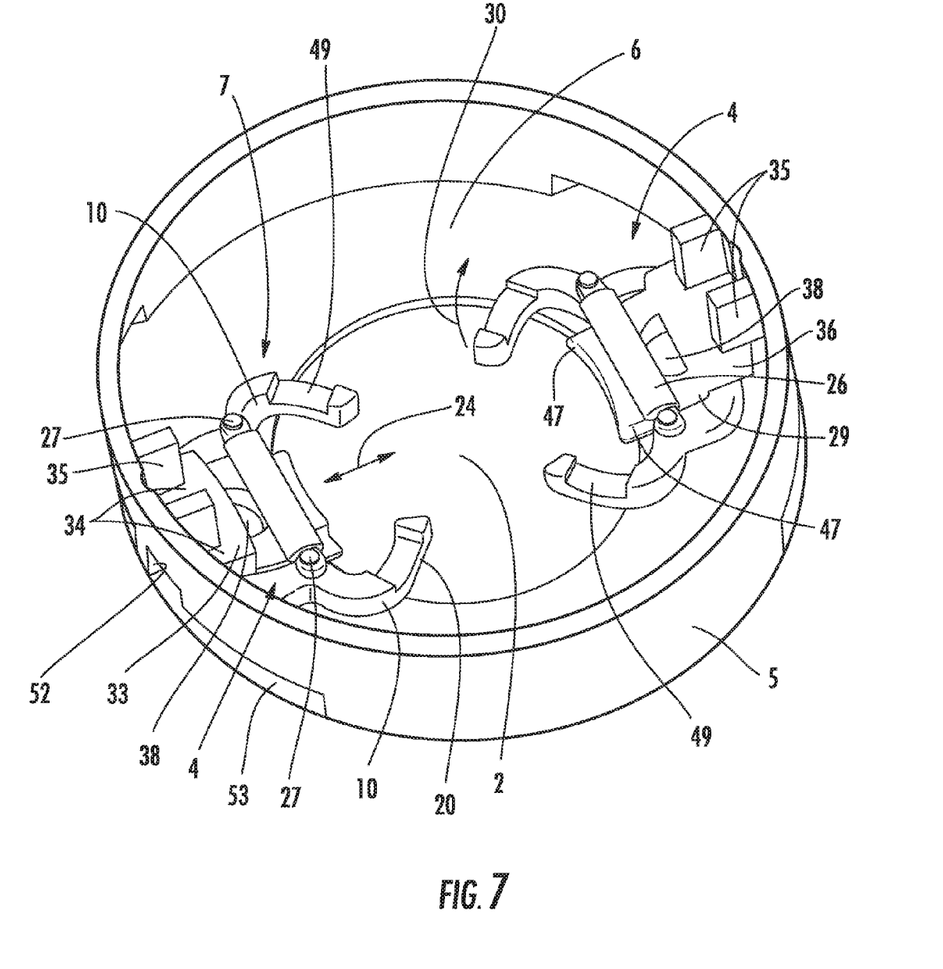
FIG. 7 an illustration according to FIG. 3, in perspective cross-section, wherein a filling funnel which covers the protective apparatuses has been partially omitted.
Figure 9:
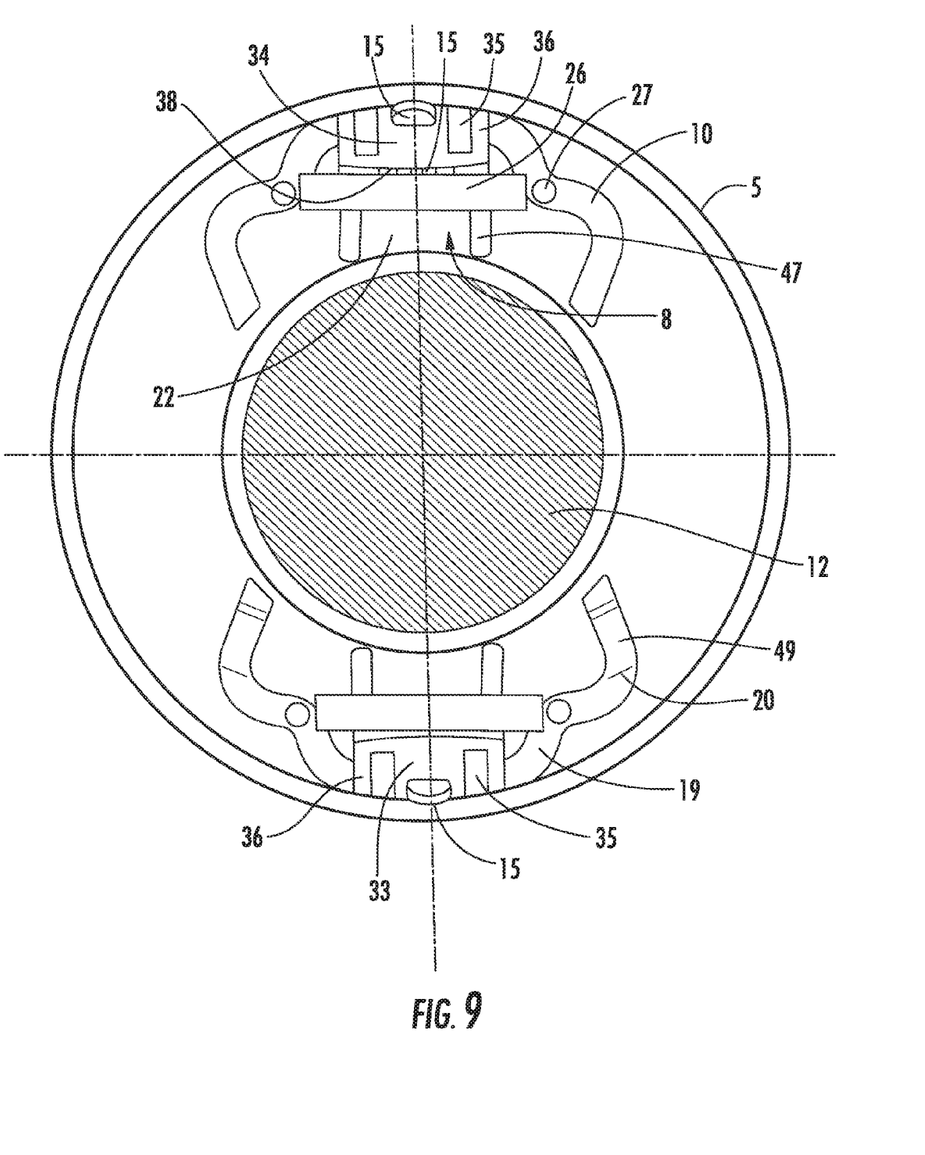
FIG. 9 a view which shows the protective apparatuses in their free-flow position.

The planar area 32 (see FIG. 5) of the flange, which area extends in a radial direction inward and away from the pivot axle 14, is measured at relatively close tolerances, so that a somewhat limited contact surface becomes available for the sliding shoes 22 for a stable sliding movement in direction 24. Consequently, the danger is relatively great that, through a severe force application by a penetrating pistol nozzle acting in the axial direction, the sliding shoe 22 can be so tipped that its end, which carries the radially outward lying projections 29, will be swung upward. In order to prevent this, on the upper side of the shoe 22, and essentially in the area of the projections 29, an upset guard 33 has been molded in as part of the original construction. The upper side 34 of the upset guard 33 acts with the detents 35 which protrude from the inner wall of the tubing collar 5. In side zones 36 in the circumferential direction, the pivotal arms 10 lie upon the activation units 18. The detents 35 and the upset guard 33 prevent not only an upset of the connector 8, but also activity of the pivotal arms 10, should a gasoline adapted pistol nozzle impinge on the blocking section 20. In the underside of the upset guard 33 is excised a recess 41 which accepts the free end 37 (see FIG. 5) of the pivot axle 14, so that the connector 8, or the upset guard 33, is impelled in a movement direction 24 on the pivot axle 14. A pivoting of the connector 8 in a circumferential direction of the collar 5 is therewith prevented. The recess 41 opens on two sides, that is to say, radially to the outside, and radially to the inside, whereby the opening towards the inside is a window 38 located in the transition zone between the sliding shoe 22 and the upset guard 33. In the released, free-flow position (see FIG. 9) the bearing lugs 15, the openings of which embrace the pivoting axle 14, penetrate the window 38 with a circumferentially designed section of the lugs.

Into the insert 3, is introduced from the top side down, a fuel entry funnel 39. This funnel 39 possesses an outlet tubing 40, the wall of which tapers diminishingly downward. The funnel also has, on its upper circumference, a molded on flange 42. With this underside construction, the tubing wall 40 is supported on the flange 6 and encompasses the main filling pipe opening 11, which is encircled by the flange 6. In the tapering tubing wall 40, are located at diametrically opposite disposed locations, the wall elements 9. The free ends of these wall elements 9 respectively possess a contacting ramp 43, which is a portion of an imaginary circular cone extending downward in a progressively reducing diameter. The free end of the wall element 9, which possesses the ramp 43, is connected with the tubing wall 40 by an inclined shoulder 44. The wall element 9 possesses, in the area of the inclined shoulder 44, lateral, i.e., circumferentially aligned, constrictions 45, which favor an elastic deformation of the wall elements 9. In the area of the ramp 43, wall sections 46 are laterally molded onto the wall element 9, which provide guidance for the connector 8 in the direction of movement 24. The wall sections 46 act with the side located guide grooves 47 of the connector 8. In the inclined shoulder 44 are to be found, in addition, two dimples 48, which are held down by the spring element 26.

The wall elements 9 are bordered by the clearances formed by the windows 50 in the tube wall 40. The windows 50 are broadened in their lower areas, that is in those areas proximal to the bottom flange 6, and are suitable for the penetration by the pivotal arms 10 or, more exactly, by the blocking section 20.

In the area of a protective apparatus 4 the cylindrical collar 5 is broken through by two windows 53 which are separated from one another by an axial web piece 52. The windows 53 form a retention space for the activation units 18 of the pivot arms 10, which swing outward when in an idle position. An upper area 54 of the window 53 tapers down and engages the axial web piece 52. In the free-flow condition the upset guard 33 is enhanced by two projections 55, which are circumferentially separated from one another and which extend into the window space 54.

Should a gasoline pistol nozzle be introduced into the filling fitting 1, then, based on the smaller diameter allowed in the wall element 9, the orifices of the fitting do not widen, and the nozzle impacts on the free end of the blocking section 20, which has penetrated into the filling pipe. In the free end of the blocking section 20 is, top side located, a recess 49, which grips a gasoline pistol nozzle by the end face and thereby, to a certain extent, fixes this centrally in the filling pipe, whereby a lateral push onto the wall element 9 is at least prevented. Conversely, the insertion of a Diesel adapted pistol nozzle 12 will impact against the ramp 43 of the wall element 9, whereby the wall element 9 is radially pressed apart and the connector 8 is pushed radially outward in the movement direction 24. Since, as has already been explained, the diametrical difference between a Diesel and a gasoline pistol nozzle amounts to only 2 mm, the connector (8) need be pushed only 1 mm radially to the outside. This very small displacement suffices to swing the pivot arms 10, i.e., their blocking sections 20, completely out of the filling pipe 2, so that the Diesel oriented pistol nozzle is permitted entry into the filling pipe opening 11.

While preferred embodiments have been shown and described, those skilled in the art will recognize that other changes and modifications may be made to the foregoing embodiments without departing from the scope and spirit of the invention. For example, specific shapes and dimensions of various elements of the illustrated embodiments may be altered to suit particular applications. It is intended to claim all such changes and modifications as fall within the scope of the appended claims and their equivalents.

The invention claimed is:

1. A protective apparatus for a tank inlet fitting for a Diesel motor vehicle, with an inlet passageway designed to receive a pistol type nozzle, wherein the protective apparatus prevents against filling the fuel tank of the Diesel motor vehicle with gasoline, the protective apparatus comprising:
   a connector and a blocking agent, the connector and blocking agent movable together between an idle position, extending into the inlet passageway, and a free-flow position, in which the connector and blocking agent permit the entry of a Diesel pistol type nozzle into the inlet passageway, the connector entering less far into the inlet passageway than the blocking agent, such that the connector enters to such a sufficient distance that it permits the entry of a Diesel pistol type nozzle, but does not permit the entry of a gasoline pistol type nozzle of a smaller diameter,
   the blocking agent including two arms, supported on a pivoting axle which runs parallel to a central axis of the inlet passageway, the arms, when in the idle position, projecting into the inlet passageway,
   the connector being movably affixed in a plane which extends transversely to the central axis and movably coupled with the arms, such that the connector swings into a free-flow condition upon the insertion of a Diesel pistol type nozzle.

2. A protective apparatus in accord with claim 1, wherein the connector is located between the arms, each arm including an activation portion at an end of the arm spaced from the inlet passageway, the connector contacting the activation portions to pivot the arms.

3. A protective apparatus in accord with claim 1, wherein the connector includes two projections, each respectively contacting one of the activation portions.

4. A protective apparatus in accord with claim 2, wherein the activation portions run approximately tangentially to the inlet passageway.

5. A protective apparatus in accord with claim 1, wherein the arms are connected to a pretensioned spring element.

6. A protective apparatus in accord with claim 4 wherein detent sections are located on the activation portions extending as far as the inlet passageway and, when in the idle position, contact side edges of the connector.

7. A protective apparatus in accord with claim 1, wherein the part of the connector which extends into the inlet passageway includes a wall element, the wall element possessing a ramp which is movably secured in such a manner that upon contact between a Diesel pistol type nozzle and the ramp, the connector is activated.

8. A protective apparatus in accord with claim 7, wherein the wall element is formed from an inward protecting surface area of an inlet tube wall.

9. A protective apparatus in accord with claim 7, wherein on the wall element is placed a guide for the connector which is effective at least in the direction of motion of the connector.

10. A protective apparatus in accord with claim 9, wherein the guide is formed by a wall section molded onto the circumferential side edges of the wall element and extending in the direction of motion of the connector.

11. A protective apparatus in accord with claim 7, wherein the wall element is bordered on its sides by two windows, each of the windows penetrating the tube wall and being penetrated by a respective pivot arm.

12. A protective apparatus in accord with claim 1, including two sets of the connector and blocking agents, each set being located at an opposite side of the inlet passageway.

13. A protective mechanism for preventing introduction of a gasoline-type nozzle into an inlet passageway of a fuel tank of a Diesel motor vehicle, the inlet passageway defining a central axis, the protective mechanism comprising:

two arms mounted at least partially within the inlet passageway, the arms being pivotable around a pivot axis substantially parallel to the central axis; and a connector mounted at least partially within the inlet passageway, the connector being movable in a plane transverse to the central axis, movement of the connector outwardly from an idle position relative to the central axis causing the arms to pivot from an idle position toward a free-flow position, the connector configured so that insertion of a gasoline-type nozzle into the inlet passageway will not move the arms to the free-flow position, whereas insertion of a Diesel-type nozzle into the inlet passageway will move the arms to the free-flow position.

14. The protective mechanism as in claim 13, wherein the connector is located between the arms.

15. The protective mechanism as in claim 13, wherein each arm includes an activation element located adjacent the pivot axis.

16. The protective mechanism as in claim 15, wherein the activation element has a curvature substantially similar to the curvature of the inlet passageway.

17. The protective mechanism as in claim 15, wherein the connector includes two projections, each projection adjacent an activation element.

18. The protective mechanism as in claim 13, wherein each arm includes a detent element, wherein when the arm is in the idle position, the detent element extends at least to the inlet passageway and is in contact with the connector.

19. The protective mechanism as in claim 13, further including a spring element for urging the arms toward the idle position.

20. The protective mechanism as in claim 13, further including a housing forming at least a part of the inlet passageway, the arms and the connector being mounted at least partially within the housing.

21. The protective mechanism as in claim 20, wherein the housing includes a ramp element, the ramp element located adjacent the connector, the ramp element configured so that insertion of a gasoline-type nozzle into the inlet passageway will not move the arms to the free-flow position.

22. The protective mechanism as in claim 20, wherein the housing has a guide element adjacent the connector, the guide element movable at least in a plane transverse to the central axis.

23. The protective mechanism as in claim 22, wherein the guide element is a side wall element of the housing.

24. The protective mechanism as in claim 20, wherein the housing includes an inner wall of the protective mechanism, the inner wall including window elements penetrable by the arms.

25. A protective mechanism for preventing introduction of a gasoline-type nozzle into an inlet passageway of a fuel tank of a Diesel motor vehicle, the inlet passageway defining a central axis, the protective mechanism comprising:

a housing forming at least part of the inlet passageway;

two arms mounted at least partially within the housing, the arms being pivotable around a pivot axis substantially parallel to the central axis;

a connector mounted at least partially within the housing, the connector being movable in a plane transverse to the central axis, movement of the connector outwardly from an idle position relative to the central axis causing the arms to pivot from an idle position toward a free-flow position; and a ramp element forming at least part of the housing, the ramp element located adjacent the connector, the ramp element configured so that insertion of a gasoline-type nozzle into the inlet passageway will not move the arms to the free-flow position, whereas insertion of a Diesel-type nozzle into the inlet passageway will move the arms to the free-flow position via the connector and the ramp.

26. The protective mechanism as in claim 25, further including a spring element for urging the arms toward the idle position.

27. The protective mechanism as in claim 25, wherein the housing includes an inner wall of the protective mechanism, the inner wall including window elements, the window elements penetrable by the arms.

28. The protective mechanism as in claim 25, including a plurality of sets of the arms, connectors, and ramp elements.

* * * * *